July 4, 1933.　　　　　K. A. SPIETH　　　　　1,916,341
TRACTOR GUIDE
Filed Feb. 5, 1931　　　2 Sheets-Sheet 1

WITNESS:
C. Ray Waddle

Karl A. Spieth
INVENTOR

July 4, 1933.　　　K. A. SPIETH　　　1,916,341
TRACTOR GUIDE
Filed Feb. 5, 1931　　　2 Sheets-Sheet 2
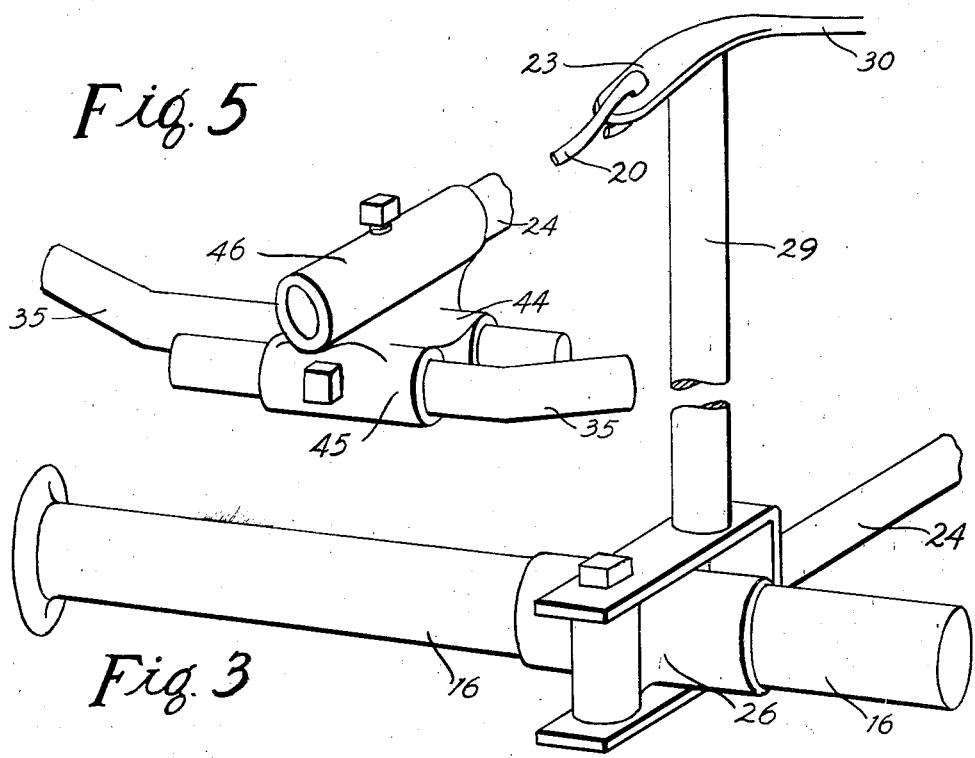
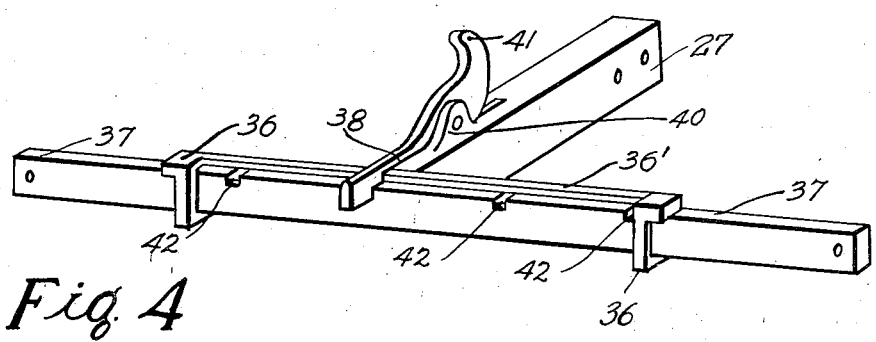
WITNESS:
Ray Waddle
Karl A. Spieth
INVENTOR Patented July 4, 1933

1,916,341

UNITED STATES PATENT OFFICE

KARL A. SPIETH, OF KEARNEY, NEBRASKA

TRACTOR GUIDE

Application filed February 5, 1931. Serial No. 513,608.

My invention relates to improvements in tractor guides and particularly to the type of guide which is designed for automatically maintaining the tractor in parallelism with a previous furrow and which has a furrow guiding member operable on either side of the tractor.

Another object of the invention is to provide novel means for connecting such steering device with the tractor, and a further object of the invention is to provide simple means for shifting the mechanism from operative to inoperative position and vice versa.

A further object of the invention is to provide simple means for attaching the guiding members by means of a projecting support extending from side of tractor, thus carrying the weight of the guiding member upon said support while in an inoperative position.

A further object of the invention is to provide means for increasing or decreasing the distance between the guiding wheels and the tractor without the necessity of the operator leaving his position on the tractor seat by means of sliding action of the link bar through the forward end of the steering arm tongue, said tongue being attached to front spindle arm or castering axle of tractor.

A further object of the invention is to provide a hand lever to be mounted upon the tractor within reach of the operator while steering the tractor. Another object is to provide an operating-rod connecting said hand lever with the guiding member in such a manner that when the free end of the hand lever is operated in a manner to tension said link, the guiding member and guide wheels will be raised clear of the furrow into an inoperative position.

A further object of the invention is to provide angular spindles for the guide wheels, and a further object is to provide a coupling in which said spindles are secured. Another object is to provide for the attachment of the push rod to the guide wheel spindle coupling in an elevated position above the level of the guide wheel spindles, the object being to gain clearance under the link bar which connects the steering arm tongue with the push rod.

Having in view these objects and others which will be pointed out in the following description, I will now refer to the drawings, in which, Figure 1 is a plan view of a tractor showing my improvements in tractor guide attached thereto.

Figure 3 is a perspective view of projecting support with the rearward part of push rod mounted thereupon by means of a universal joint.

Figure 4 is a perspective view of the spacing adjustment showing sliding link bar with a plurality of recesses, together with engaging latch, both being supported by the T-shaped attachment for the forward end of steering arm tongue.

Figure 5 is a perspective view of the furrow guide wheel spindle and push rod coupling with spindles and a forward end-portion of push rod in place.

Figure 1:
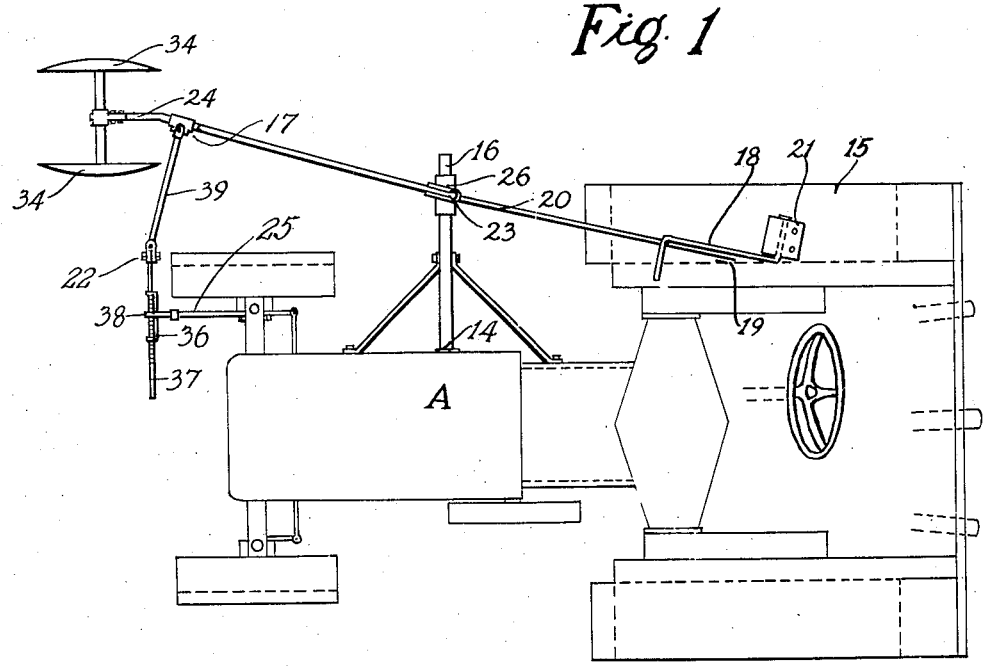
Figure 2:
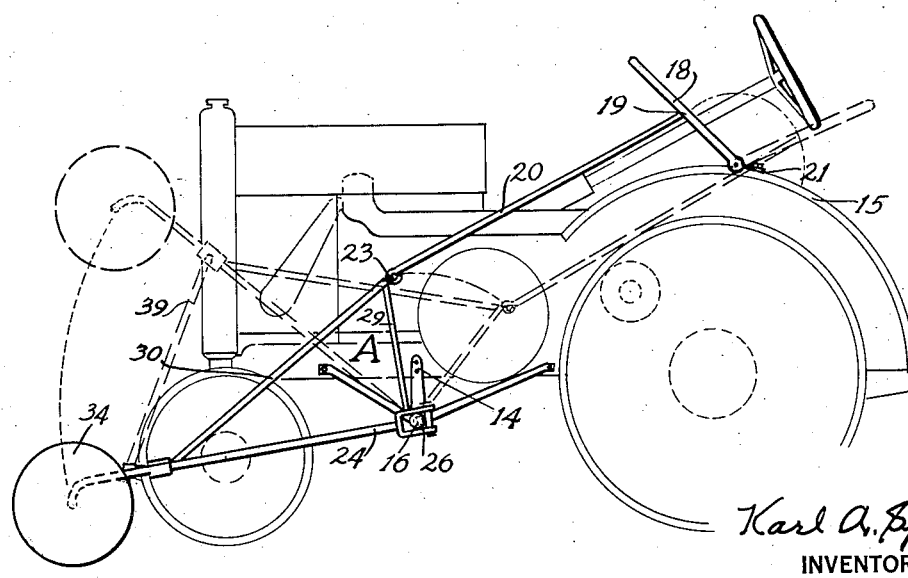
Figure 2 is a side elevation of the guide structure attached to tractor in operative position.

In the accompanying drawings, I have used the reference numeral 15 to indicate the body or frame of a tractor A. Attached to 15 is the boxing 21 which receives and in which the hand lever 18 pinions. The support or supporting-frame 16 is attached to the side of tractor A at 14. 26 is a universal bearing mounted upon the support 16 in a position of greater or lesser distance from the tractor, depending upon the distance that the tractor is to be operated from the furrow in which the guide wheels 34 are to travel, the aim being to keep the push rod 24 as near parallel with the direction in which the tractor is to travel as may be.

The push rod 24 has its horizontal and vertical play through the universal bearing 26 which is attached to the rearward end of said push rod 24. Truss rod 30 attaches to forward end of push rod 24, and to upper end of standard 29. 20 is an operating rod connecting the hand lever 18 at 19 with truss rod loop at 23.

Figure 4 shows in detail a construction of the spacing device in which numerals 36 indicate the collars through which the adjusting bar 37 slides when the latch 38 is operated to clear the recesses 42. Latch 38 is pivotally mounted between the ears 40 and is preferably operated from the driver's seat by the pulling of a cord or rope (not shown) attached at 41.

Figure 5 shows in detail the construction of the guide wheel spindle and push rod coupling in which 44 and 45 are sleeves in which spindles 35 are secured by set screws, and 46 indicates a sleeve in which the push rod 24 is secured at its forward end. The spindles 35 being of angular shape, rotating of same in their sleeves permits a variety of positions in which the guiding wheels may be set in order to more fully conform to the shape and width of the furrow. Sleeve 46, being above the level of guide wheel spindles 35 when attached to push rod 24, gains more clearance under link bar 39 which is desirable in the event that the furrow in which the guide wheels travel is of a greater depth than the radius of the guide wheels.

It will be understood that the link-bar 39 is pivotally connected at 17 with the push-bar 24 near the front end thereof, said link-bar being also pivotally connected with the outer end of the adjusting-bar 37 as indicated at 22, these parts being clearly shown in Fig. 1 of the drawings.

Also, it should be stated that the body of the T-shaped attachment heretofore mentioned is indicated at 27 and it may be secured to the steering-arm 25 of the tractor by any suitable means. The head of this T-shaped attachment is indicated at 36', and it will be noted that the adjusting-bar 37 during its sliding movements will be maintained at right-angles to the body 27 of the steering-arm attachment since the head-piece 36' and adjusting-bar 37 are both rectilinear and are disposed parallel relative to each other.

Since the T-shaped attachment extends forwardly of the steering-arm 25 and is secured thereto it may be considered as the steering-arm itself, and so designated in the appended claims.

*Practical operation*

In the operation of my improved devices in bringing the guide wheels 34 and their push-bar 24 into inoperative position, the supporting member 16 acts as a fulcrum for the push-rod 24, the standard 29 and the operating-rod 20, and there is no added weight thrown upon the front steering mechanism of the tractor and therefore no added hindrance to the manual steering of the tractor.

It is understood that this improvement in tractor guides includes the utilization of same in attachment to and conjunction with either or both sides of the tractor.

Some changes may be made in the construction and arrangement of the parts of my devices without departing from the spirit and purpose of my invention, and it is my aim to cover by my claims any modified forms or use of mechanical equivalents, which may be reasonably included within their scope.

I claim as my invention:

1. In a tractor guide structure, an approximately horizontal supporting-frame projecting from the side and rigidly secured to the tractor, a push-rod extending forwardly and fulcrumed on said frame and provided with a furrow-guide, a steering-arm extending forwardly of the tractor and connected with the steering mechanism thereof, a link connecting the push-rod with said steering-arm, a standard fulcrumed on the supporting-frame, a truss-rod connecting the push-rod with the standard, and an operating-rod movable to cause a rearward swinging movement of the standard for elevating the push-rod and said furrow-guide.

2. In a tractor guide structure, a horizontal supporting-frame projecting from the side of the tractor, a push-rod projecting forwardly from said frame and fulcrumed thereon and provided at its front end with a furrow-guide, a steering-arm connected with the steering mechanism of the tractor, a link connecting the push-rod with said steering-arm, a standard connected with the push-rod and fulcrumed on the supporting-frame and adapted to be swung rearwardly to cause coincident elevation of said link, said push-rod and said furrow-guide.

3. In a tractor guide structure, a supporting-frame projecting outwardly and secured to the side of the tractor, a push-rod projecting forwardly and fulcrumed on the supporting-frame, a furrow-guide mounted on the front end of the push-rod, a steering-arm connected with the steering-mechanism of the tractor, a link connecting the push-rod with said arm, a standard fulcrumed on the supporting-frame, a truss-rod connecting the push-rod with said standard, an operating-rod connected with the standard, and a hand-lever mounted on the tractor and arranged to have a swinging movement to cause coincident actuation of the operating-rod, said standard, said truss-rod, said push-rod and link for elevating said furrow-guide.

4. In a tractor-guide structure, an approximately horizontal supporting-member projecting outwardly from the side and secured to the tractor, a forwardly projecting push-rod fulcrumed on the supporting-member and provided with a furrow-guide, a standard fulcrumed on the supporting-member and connected with the push-rod, a steering-arm connected with the steering mechanism of the tractor, and a link connecting the push-rod with the steering-arm, said standard being arranged to have a rearward swinging movement to cause the furrow-guide to move upwardly, and adapted to have a forward swinging movement to cause said furrow-guide to move downwardly.

5. In a tractor guide structure, an approximately horizontal supporting-member projecting from the side of the tractor and mounted thereon, a forwardly projecting push-rod provided with a furrow-guide and fulcrumed on the supporting-member, a steering-arm connected with the steering mechanism of the tractor, a link connecting the push-rod with the steering-arm, a truss-rod movable for elevating the push-rod, said furrow-guide and said link, a standard fulcrumed on the supporting member and movable for moving the truss-rod, an operating-rod movable for moving the standard, and a hand-lever arranged to be moved for moving said operating-rod.

6. In a tractor guide structure, a steering-arm connected with the steering mechanism of the tractor and having a head-plate disposed at approximately right-angles thereto, an adjusting-bar slidingly mounted on said head-plate, a supporting-frame projecting from and secured to the side of the tractor, a push-rod fulcrumed on said frame and provided with a furrow-guide, a link pivotally connected with the push-rod and having a pivotal connection with the adjusting-bar, a standard fulcrumed on the supporting-frame and connected with the push-rod and adapted to be reciprocated longitudinally of the tractor for elevating and lowering said push-rod and furrow-guide.

7. In a tractor guide structure, a steering-arm connected with the steering mechanism of the tractor, an attachment approximately of T-shape provided with collars and mounted on the steering-arm, a supporting-member projecting from the side of the tractor and secured thereto, a push-bar fulcrumed on said supporting-member and having a guide for engaging in a furrow, a standard fulcrumed on said supporting-member, a truss-bar mounted on the push-rod and connected with the standard, a link-bar pivotally connected with the push-rod, an adjusting-bar disposed in the collars of said steering-arm attachment and provided at longitudinal intervals with recesses and pivotally connected with said link-bar, and a latch pivotally mounted on the steering-arm attachment for engagement in a selected recess of the adjusting-bar, said guide being movable in the furrow for moving said link-bar, said adjusting-bar and said steering-arm, said standard being adapted to have a swinging movement for elevating said guide from the furrow.

8. In a tractor guide structure, a supporting-member projecting outwardly from the side of the tractor and secured thereto, a push-rod fulcrumed on the supporting-member and having a guide for engaging in a furrow, a steering-arm connected with the steering mechanism of the tractor and having a T-shaped part provided with collars, an adjusting-bar provided with recesses and slidingly disposed in the collars of said T-shaped part of said steering-arm, a link-bar connecting the push-bar with the adjusting-bar, and a latch on said steering-arm for engaging in a recess of the adjusting-arm, said guide being movable in the furrow for moving the push-rod, said link-bar, said adjusting-bar and said steering-arm for steering the tractor.

9. In a tractor guide structure, a push-rod fulcrumed upon and extending forwardly at the side of the tractor, a furrow-guide including a pair of connected parallel sleeves, a pair of angular spindles in said sleeves to provide bearings for a pair of guide-wheels, and a third sleeve disposed at right-angles to the first named sleeves upon the upper sides thereof and secured thereto for receiving the front end of the push-rod, a steering-arm approximately of T-shape provided with collars and connected with the steering mechanism of the tractor, an adjusting-bar provided with recesses and slidingly mounted in said collars, a latch on the steering-arm for engaging in a recess of the adjusting-bar, and a link-bar pivotally connecting the push-bar with the adjusting-bar, said furrow-guide being movable for moving the push-rod, said link-bar, said adjusting-bar and said steering-arm for steering the tractor.

10. In a tractor guide structure, a supporting-member projecting outwardly from the side and secured to the tractor, a steering-arm connected with the steering mechanism of the tractor, a push-rod fulcrumed on the supporting-member projecting forwardly therefrom and connected with said steering-arm, a standard fulcrumed on said supporting-member and connected with the push-rod, a guide mounted on the push-rod and adapted to travel in a furrow and to move the push-rod and steering-arm, and an operating-rod mounted on the tractor and connected with the standard adapted to be reciprocated for elevating and lowering said guide.

11. In a tractor guide structure, a forwardly projecting push-rod mounted on the tractor to permit vertical and horizontal swinging movements, a steering-arm of approximately T-shape provided with collars and connected with the steering mechanism of the tractor, an adjusting-bar provided with recesses and disposed slidingly in said collars, a latch for engaging in a recess, a link-bar pivotally connected with the adjusting-bar and said push-rod, a guide consisting of a pair of parallel sleeves, a pair of angular spindles in said sleeves, a pair of wheels journalled on said spindles and a third sleeve disposed at approximately right-angles to the first named sleeves for receiving an end-portion of said push-bar, said guide being movable for moving the push-bar, said link-bar, said adjusting-bar and steering-arm for steering said tractor.

12. In a tractor guide structure, a push-bar projecting forwardly and mounted to permit vertical and horizontal swinging movements from the tractor, a truss-rod mounted on the front part of the push-rod and extending rearwardly, a steering-arm approximately of T-shape connected with the steering mechanism of the tractor and provided with collars, an adjusting-bar provided with recesses and disposed in said collars, a latch on the steering-arm for engaging in a selected recess of said adjusting-bar, a link-bar connected with the push-bar and pivotally connected with the adjusting-bar, a guide on said push-rod adapted to travel in a furrow and to move said push-rod and steering-arm for steering the tractor, a standard pivotally mounted on the tractor and connected with the truss-rod and adapted to be moved for elevating said guide from a furrow.

13. In a tractor guide structure, a push-rod projecting forwardly and mounted on the tractor to permit vertical and horizontal movements, a steering-arm of T-shape connected with the steering mechanism of the tractor and provided with collars, an adjusting-bar slidable in said collars, a latch on the steering-arm for engaging the adjusting-bar, a link-bar pivotally connecting the adjusting-bar with the push-bar, and a guide on the push-bar adapted to be moved for moving the link-bar and steering-arm for steering the tractor.

14. In a tractor guide structure, a steering-arm connected with the steering mechanism of the tractor, a supporting-member projecting outwardly of the side and secured to the tractor, a push-rod having a guide for engaging in a furrow and mounted on the supporting-member to permit vertical and horizontal swinging movements thereof, a link-bar connecting the push-bar and said steering-arm, a standard connected with the push-rod and mounted to permit a swinging movement on said supporting-member for elevating the guide from the furrow.

In testimony whereof I affix my signature.

KARL A. SPIETH.